(12) United States Patent
Shimizu et al.

(10) Patent No.: US 11,458,708 B2
(45) Date of Patent: Oct. 4, 2022

(54) DECORATIVE SHEET, DECORATIVE PANEL, AND COATING AGENT FOR FORMING SURFACE PROTECTIVE LAYER

(71) Applicant: Dai Nippon Printing Co., Ltd., Tokyo (JP)

(72) Inventors: Yohei Shimizu, Tokyo (JP); Jin Arakida, Tokyo (JP); Masataka Wada, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 17/272,952

(22) PCT Filed: Sep. 5, 2019

(86) PCT No.: PCT/JP2019/035013
§ 371 (c)(1),
(2) Date: Mar. 3, 2021

(87) PCT Pub. No.: WO2020/050366
PCT Pub. Date: Mar. 12, 2020

(65) Prior Publication Data
US 2021/0276309 A1    Sep. 9, 2021

(30) Foreign Application Priority Data

Sep. 7, 2018 (JP) ............................. JP2018-168007
Mar. 27, 2019 (JP) ............................. JP2019-061475

(51) Int. Cl.
*B32B 21/08* (2006.01)
*B32B 3/30* (2006.01)
(Continued)

(52) U.S. Cl.
CPC ................ *B32B 21/08* (2013.01); *B32B 3/30* (2013.01); *B32B 7/12* (2013.01); *B32B 27/16* (2013.01);
(Continued)

(58) Field of Classification Search
CPC .. B32B 21/08; B32B 3/30; B32B 7/12; B32B 27/16; B32B 27/32; B32B 2471/00;
(Continued)

(56) References Cited

FOREIGN PATENT DOCUMENTS

| CN | 103382371 A | 11/2013 |
|---|---|---|
| JP | 2004-268374 A | 9/2004 |

(Continued)

OTHER PUBLICATIONS

International Search Report dated Oct. 8, 2019, issued for PCT/JP2019/035013.
(Continued)

*Primary Examiner* — Catherine A. Simone
(74) *Attorney, Agent, or Firm* — Locke Lord LLP; James E. Armstrong, IV; Nicholas J. DiCeglie, Jr.

(57) ABSTRACT

A decorative sheet having a surface-protecting layer, the surface-protecting layer having excellent contamination resistance, alkali resistance, etc., for a long period of time, while limiting the occurrence of breakage and cracks when an impact is applied thereto or during processing; and a decorative plate using the decorative sheet is provided. Specifically, a decorative sheet comprising a laminate, the laminate comprising at least a base material sheet and a first surface-protecting layer in sequence in the thickness direction; (1) the first surface-protecting layer comprising an ionizing radiation-curable resin containing two kinds of aliphatic urethane acrylates, i.e., resin A and resin B, wherein resin A is an aliphatic urethane acrylate with an isocyanurate skeleton, and resin B is an aliphatic urethane
(Continued)

acrylate with an alicyclic skeleton without an isocyanurate skeleton, and (2) the first surface-protecting layer having a nanoindentation hardness of 160 MPa or more and 240 MPa or less.

16 Claims, 3 Drawing Sheets (51) Int. Cl.
| | |
|---|---|
| B32B 27/16 | (2006.01) |
| B32B 27/32 | (2006.01) |
| E04F 13/08 | (2006.01) |
| E04F 15/10 | (2006.01) |
| C09D 7/62 | (2018.01) |
| B32B 7/12 | (2006.01) |
| C09D 175/16 | (2006.01) |

(52) U.S. Cl.
CPC ............... *B32B 27/32* (2013.01); *C09D 7/62* (2018.01); *C09D 175/16* (2013.01); *E04F 13/0866* (2013.01); *E04F 15/107* (2013.01); *B32B 2255/10* (2013.01); *B32B 2255/26* (2013.01); *B32B 2307/402* (2013.01); *B32B 2307/412* (2013.01); *B32B 2307/536* (2013.01); *B32B 2451/00* (2013.01); *B32B 2471/00* (2013.01)

(58) Field of Classification Search
CPC .......... B32B 2451/00; B32B 2307/536; B32B 2307/412; B32B 2307/402; B32B 2255/26; B32B 2255/10; C09D 7/62; C09D 175/16; E04F 13/0866; E04F 15/107
See application file for complete search history.

(56) References Cited

FOREIGN PATENT DOCUMENTS

| | | |
|---|---|---|
| JP | 2006-007728 A | 1/2006 |
| JP | 2012-213913 A | 11/2012 |
| JP | 2013-078847 A | 5/2013 |
| JP | 2014-069505 A | 4/2014 |
| JP | 2015-067777 A | 4/2015 |

OTHER PUBLICATIONS

Office Action issued in corresponding Chinese Patent Application No. CN 201980058013.5, dated Jul. 19, 2022.

DECORATIVE SHEET, DECORATIVE PANEL, AND COATING AGENT FOR FORMING SURFACE PROTECTIVE LAYER

TECHNICAL FIELD

The present invention relates to a decorative sheet, a decorative plate, and a surface-protecting layer-forming coating agent.

BACKGROUND ART

Conventionally, various decorative sheets have been used, for example, for surface decoration of fittings, floors, walls, and the like used for interior materials of buildings. For example, decorative sheets comprising a laminate having a base material sheet, a transparent resin layer, and a surface-protecting layer in sequence in the thickness direction are widely used. It is known, for example, to optionally provide an ornamental layer on the base material sheet, to provide a primer layer between the transparent resin layer and the surface-protecting layer in order to increase adhesiveness, or to add an ionizing radiation-curable resin as a resin component of the surface-protecting layer in order to increase the scratch resistance of the surface-protecting layer.

As a specific example of decorative sheets, PTL 1 discloses a decorative sheet used for inner layers of buildings, surface decoration of fittings, vehicle interiors, etc. Example 1 of PTL 1 discloses a decorative sheet comprising, in sequence in the thickness direction, a base material sheet 2, a coloring layer 3, a wood-grain pattern picture layer 4, an adhesive layer 5, a transparent resin layer 6, a primer layer 7 having a thickness of 2 μm, and a surface-protecting layer 8 having a thickness of 5 μm formed from an electron beam-curable resin composition (paragraph [0037] and FIG. 1 of PTL 1).

Thus, ionizing radiation-curable resins are often used as resins that constitute surface-protecting layers. However, a surface-protecting layer formed from an ionizing radiation-curable resin has large curing shrinkage; therefore, without sufficient surface treatment of the inorganic filler contained in the surface-protecting layer, the contamination resistance, alkali resistance, etc., may be adversely affected. In addition, the surface-protecting layer formed from an ionizing radiation-curable resin is very hard and is thus brittle, and cracks and breakage easily occur due to impact.

In order to improve the above problems, for example, PTL 2 discloses "a decorative sheet wherein in an ionizing radiation-curable resin containing an inorganic filler treated with a silane coupling agent containing an unsaturated double bond, the uppermost surface layer is composed of a resin wherein the NCO number of an aliphatic isocyanate is added in an amount 1.1 times or more of the hydroxyl number of a main agent obtained by mixing 50 parts to 200 parts of an acrylic urethane polyol resin compounded with an aliphatic urethane with 100 parts by weight of the ionizing radiation-curable resin; and a decorative material using the decorative sheet."

The technique disclosed in PTL 2 is described as alleviating curing shrinkage by mixing an ionizing radiation-curable resin containing an inorganic filler with a two-component curable acrylic polyol and an aliphatic isocyanate, as maintaining contamination resistance, alkali resistance, etc., and as overcoming cracks due to impact resistance and environmental resistance (paragraph [0005]). However, this technique has a concern that the physical properties, such as contamination resistance and impact resistance, may become unstable due to the curing of the aliphatic isocyanate over time.

For this reason, there has been a demand for the development of decorative sheets comprising a surface-protecting layer, the surface-protecting layer having excellent contamination resistance, alkali resistance, etc., for a long period of time, while limiting the occurrence of breakage and cracks when an impact is applied thereto or during processing.

CITATION LIST

Patent Literature

PTL 1: JP2006-7728A
PTL 2: JP2004-268374A

SUMMARY OF INVENTION

Technical Problem

An object of the present invention is to provide a decorative sheet comprising a surface-protecting layer, the surface-protecting layer having excellent contamination resistance, alkali resistance, etc., for a long period of time, while limiting the occurrence of breakage and cracks when an impact is applied thereto or during processing, and to also provide a decorative plate using the decorative sheet. Another object of the present invention is to provide a surface-protecting layer-forming coating agent that is useful to form the surface-protecting layer of the decorative sheet.

Solution to Problem

As a result of extensive studies, the present inventors found that the above objects could be achieved by a decorative sheet comprising a laminate, the laminate comprising at least a base material sheet and a first surface-protecting layer in sequence in the thickness direction, the first surface-protecting layer comprising a specific ionizing radiation-curable resin. Thus, the present invention has been completed.

Specifically, the present invention relates to the following decorative sheet, decorative plate, and surface-protecting layer-forming coating agent.

1. A decorative sheet comprising a laminate, the laminate comprising at least a base material sheet and a first surface-protecting layer in sequence in the thickness direction;
  (1) the first surface-protecting layer comprising an ionizing radiation-curable resin containing two kinds of aliphatic urethane acrylates, i.e., resin A and resin B, wherein resin A is an aliphatic urethane acrylate with an isocyanurate skeleton, and resin B is an aliphatic urethane acrylate with an alicyclic skeleton without an isocyanurate skeleton; and
  (2) the first surface-protecting layer having a nanoindentation hardness of 160 MPa or more and 240 MPa or less.

2. The decorative sheet according to Item 1, wherein the alicyclic skeleton is at least one of isophorone and cyclohexane.

3. The decorative sheet according to Item 1 or 2, wherein the ionizing radiation-curable resin is an electron beam-curable resin.

4. The decorative sheet according to any one of Items 1 to 3, wherein the first surface-protecting layer comprises an inorganic filler.

5. The decorative sheet according to Item 4, wherein the inorganic filler is a hydrophobized inorganic filler.

6. The decorative sheet according to any one of Items 1 to 5, wherein the first surface-protecting layer has a thickness of 5 μm or more and 30 μm or less.

7. The decorative sheet according to any one of Items 1 to 6, wherein a second surface-protecting layer is present, adjacent to the first surface-protecting layer, between the base material sheet and the first surface-protecting layer, the second surface-protecting layer has a nanoindentation hardness of 100 MPa or more and 240 MPa or less, and the nanoindentation hardness of the second surface-protecting layer is less than that of the first surface-protecting layer.

8. The decorative sheet according to Item 7, wherein the second surface-protecting layer has a thickness of 5 μm or more and 15 μm or less.

9. The decorative sheet according to any one of Items 1 to 8, which is used as a member of a decorative plate for floors.

10. A decorative plate comprising a laminate, the laminate comprising at least a decorative plate base and the decorative sheet according to any of Items 1 to 9 in sequence in the thickness direction.

11. The decorative plate according to Item 10, wherein the decorative plate base is at least one member selected from the group consisting of medium-density wood fiberboards, high-density wood fiberboards, particleboards, coniferous tree plywood, broadleaf tree plywood, fast-growing plywood, cork sheets, cork-containing composite base materials, and thermoplastic resin sheets.

12. A coating agent for forming a surface-protecting layer that constitutes a decorative sheet, the coating agent comprising an ionizing radiation-curable resin containing two kinds of aliphatic urethane acrylates, i.e., resin A and resin B, wherein resin A is an aliphatic urethane acrylate with an isocyanurate skeleton, and resin B is an aliphatic urethane acrylate with an alicyclic skeleton without an isocyanurate skeleton.

13. The surface-protecting layer-forming coating agent according to Item 12, for forming a first surface-protecting layer that constitutes the decorative sheet according to any one of Items 1 to 9.

Advantageous Effects of Invention

The decorative sheet of the present invention is characterized in that it is a decorative sheet comprising a laminate, the laminate comprising at least a base material sheet and a first surface-protecting layer in sequence in the thickness direction;

(1) the first surface-protecting layer comprising an ionizing radiation-curable resin containing two kinds of aliphatic urethane acrylates, i.e., resin A and resin B, wherein resin A is an aliphatic urethane acrylate with an isocyanurate skeleton, and resin B is an aliphatic urethane acrylate with an alicyclic skeleton without an isocyanurate skeleton; and (2) the first surface-protecting layer having a nanoindentation hardness of 160 MPa or more and 240 MPa or less. Due to these characteristics, in the decorative sheet of the present invention, the surface-protecting layer has excellent contamination resistance, alkali resistance, etc., for a long period of time, while limiting the occurrence of breakage and cracks when an impact is applied thereto or during processing.

BRIEF DESCRIPTION OF DRAWINGS

FIG. 1 is a cross-sectional view schematically showing an example of the decorative sheet of the present invention.

FIG. 1-1 shows a surface-protecting layer having a single-layer structure (a first surface-protecting layer alone), and FIG. 1-2 shows a surface-protecting layer having a double-layer structure (a first surface-protecting layer and a second surface-protecting layer).

FIG. 3 shows schematic diagrams explaining (a) a Berkovich indenter used for the measurement of nanoindentation hardness in the present specification, (b) the relationship between the direction of the load and the indentation depth h, and (c) the relationship between the indentation depth and the indentation load.

DESCRIPTION OF EMBODIMENTS

1. Decorative Sheet

The decorative sheet of the present invention is characterized in that it is a decorative sheet comprising a laminate, the laminate comprising at least a base material sheet and a first surface-protecting layer in sequence in the thickness direction;

(1) the first surface-protecting layer comprising an ionizing radiation-curable resin containing two kinds of aliphatic urethane acrylates, i.e., resin A and resin B, wherein resin A is an aliphatic urethane acrylate with an isocyanurate skeleton, and resin B is an aliphatic urethane acrylate with an alicyclic skeleton without an isocyanurate skeleton; and (2) the first surface-protecting layer having a nanoindentation hardness of 160 MPa or more and 240 MPa or less. Due to these characteristics, in the decorative sheet of the present invention, the surface-protecting layer has excellent contamination resistance, alkali resistance, etc., for a long period of time, while limiting the occurrence of breakage and cracks when an impact is applied thereto or during processing.

The decorative sheet of the present invention comprises a laminate comprising at least a base material sheet and a first surface-protecting layer in sequence in the thickness direction. The specific structure (layer structure) thereof is not limited as long as the predetermined requirements of the first surface-protecting layer are satisfied.

Figure 11:
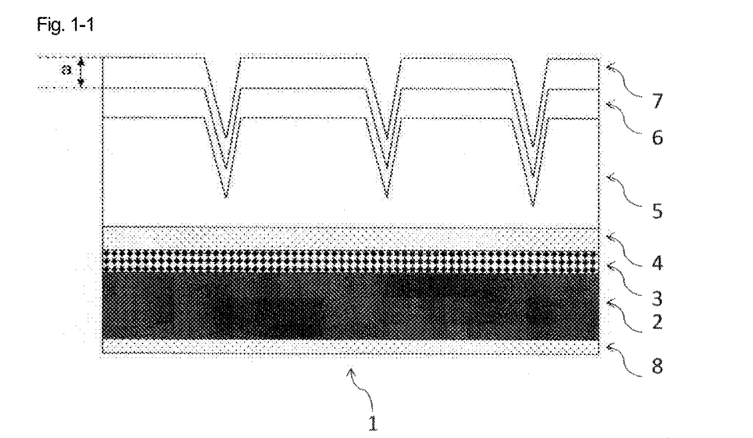
Figure 12:
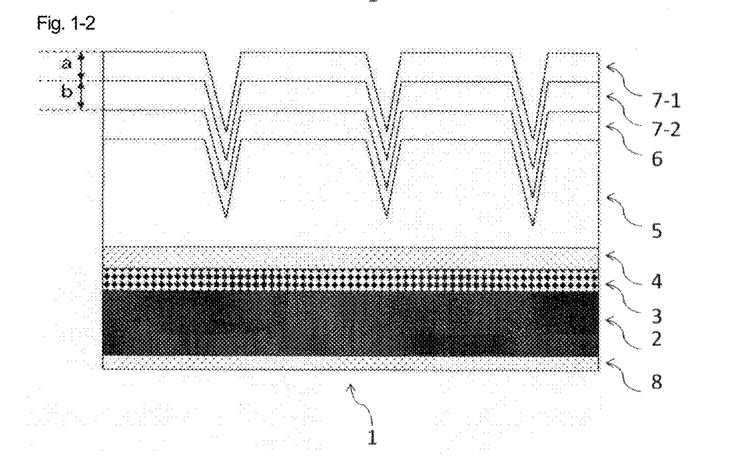

A specific embodiment is, for example, a decorative sheet comprising a picture pattern layer, a transparent adhesive layer, a transparent resin layer, a primer layer, and a first surface-protecting layer sequentially laminated on a base material sheet (decorative sheet 1 in FIG. 1-1). Another embodiment is, for example, a decorative sheet comprising a picture pattern layer, a transparent adhesive layer, a transparent resin layer, a primer layer, a second surface-protecting layer, and a first surface-protecting layer sequentially laminated on a base material sheet (decorative sheet 1 in FIG. 1-2). Thus, the surface-protecting layer may have a single-layer structure with the first surface-protecting layer alone, or a multi-layer structure including the first surface-protecting layer; however, in both embodiments, the outermost layer of the decorative sheet is the first surface-protecting layer. In order to increase the adhesiveness with the decorative plate base, a back-side primer layer may be provided, as needed, on the back surface of the decorative sheet, as shown in FIG. 1. In the following, the single-layer structure with the first surface-protecting layer, and the double-layer structure with the first surface-protecting layer and the second surface-protecting layer are also collectively referred to as the "surface-protecting layer."

In this specification, the direction in which the surface-protecting layer is laminated, as viewed from the base material sheet, is referred to as "above" or "front surface"; and the direction in which the back-side primer layer is laminated, as viewed from the base material sheet, is referred to as "below" or "back surface." The "surface of the front (side)" of the decorative sheet or decorative plate or the "surface of the surface-protecting layer (side)" refers to the surface that can be viewed after the decorative sheet or decorative plate has been formed. In the following, "the side of the surface-protecting layer" is also abbreviated as "the surface-protecting layer side."

The decorative sheet is described below with reference to the drawings.

FIG. 1 is a cross-sectional view showing an example of the decorative sheet of the present invention. The decorative sheet 1 shown in FIG. 1-1 comprises a picture pattern layer 3, a transparent adhesive layer 4, a transparent resin layer 5, a primer layer 6, and a first surface-protecting layer 7 laminated on a base material sheet 2, and an embossed projection and depression pattern is formed from the surface-protecting layer side. Further, the decorative sheet 1 shown in FIG. 1-2 comprises a picture pattern layer 3, a transparent adhesive layer 4, a transparent resin layer 5, a primer layer 6, a second surface-protecting layer 7-2, and a first surface-protecting layer 7-1 laminated on a base material sheet 2, and an embossed projection and depression pattern is formed from the surface-protecting layer side. In both embodiments in FIGS. 1-1 and 1-2, a back-side primer layer 8 is laminated on the back surface of the base material sheet 2. As shown by a in FIG. 1-1, and a and b in FIG. 1-2, the thicknesses of the first surface-protecting layer and second surface-protecting layer in the decorative sheet of the present invention refer to the values measured at places where the embossed projection and depression pattern is not formed.

Each layer constituting the decorative sheet of the present invention is described in detail below. In the following description, the lower and upper limits of the numerical range represented by "to" mean "or more and or less" (e.g., "α to β" means "α or more and β or less").

Base Material Sheet

The surface-protecting layer etc. are sequentially laminated on the surface (front surface) of the base material sheet. Although the material of the base material sheet is not limited, a non-halogen-based thermoplastic resin is preferably contained.

Examples of the non-halogen-based thermoplastic resin include olefin-based thermoplastic resins, such as low-density polyethylene (including linear low-density polyethylene), medium-density polyethylene, high-density polyethylene, ethylene-α-olefin copolymers, homopolypropylene, polymethylpentene, polybutene, ethylene-propylene copolymers, propylene-butene copolymers, ethylene-vinyl acetate copolymers, saponified ethylene-vinyl acetate copolymers, or mixtures thereof; thermoplastic ester-based resins, such as polyethylene terephthalate, polybutylene terephthalate, polyethylene naphthalate, polyethylene naphthalate-isophthalate copolymers, polycarbonate, and polyarylate; acrylic thermoplastic resins, such as methyl poly(meth)acrylate, ethyl poly(meth)acrylate, ethyl polyacrylate, and butyl polyacrylate; polyamide-based thermoplastic resins, such as nylon-6 and nylon-66; polyimide, polyurethane, polystyrene, acrylonitrile-butadiene-styrene resins, and the like. These non-halogen-based thermoplastic resins may be used singly or in a combination of two or more. Of these, olefin-based thermoplastic resins are preferable because they have excellent printability and embossing properties for the picture pattern layer and are inexpensive.

The base material sheet may be colored. In this case, colorants (pigments or dyes) may be added to such non-halogen-based thermoplastic resins as described above. Examples of usable colorants include inorganic pigments such as titanium dioxide, carbon black, and iron oxide; organic pigments such as phthalocyanine blue; and various dyes. Such colorants may be selected from one or more known or commercially available products. The amount of colorants may be selected according to the desired color etc.

The base material sheet may contain, as needed, various kinds of additives, such as fillers, matting agents, foaming agents, flame retardants, lubricants, antistatic agents, antioxidants, ultraviolet absorbers, and light stabilizers.

The thickness of the base material sheet is preferably 40 to 100 µm. If the thickness of the base material sheet is less than 40 µm, when the decorative plate base has unevenness, the unevenness may not be sufficiently suppressed from appearing on the surface of the decorative plate. If the thickness of the base material sheet exceeds 100 µm, roll lamination may be difficult due to the curliness of the decorative sheet when stored in a roll. The thickness of the base material sheet is more preferably 60 to 80 µm. The base material sheet may be composed of a single layer or multiple layers.

The surface (front surface) of the base material sheet may be subjected to a corona discharge treatment in order to enhance the adhesion of the ink that forms a picture pattern layer. The corona discharge treatment may be performed according to known methods under known conditions. The back surface of the base material sheet may be subjected to a corona discharge treatment or a synthetic-resin backer layer and/or back-side primer layer, described later, may be formed, as needed.

Picture Pattern Layer

The picture pattern layer is an optional layer that imparts a desired picture (design) to the decorative sheet, and the kind etc. of the picture are not limited. Examples include wood-grain patterns, leather patterns, marble grain patterns, pebbly patterns, tiled patterns, brick-masonry patterns, textile patterns, geometric figures, characters, symbols, abstraction patterns, and the like.

The method of forming a picture pattern layer is not particularly limited. For example, the picture pattern layer may be formed on the surface of a base material sheet by a printing method using ink obtained by dissolving (or dispersing) a known colorant (dye or pigment) together with a binding resin in a solvent (or a dispersion medium). As the ink, an aqueous composition can also be used from the viewpoint of reducing the VOC of the decorative sheet.

Examples of colorants include inorganic pigments, such as carbon black, titanium white, zinc oxide, red iron oxide, Berlin blue, and cadmium red; organic pigments, such as azo pigments, lake pigments, anthraquinone pigments, quinacridone pigments, phthalocyanine pigments, isoindolinone pigments, and dioxazine pigments; metallic powder pigments, such as aluminum powder and bronze powder; pearlescent pigments, such as titanium oxide-coated mica and bismuth chloride oxide; fluorescent pigments; noctilucent pigments; and the like. Such colorants may be used singly or in a combination of two or more. These colorants may be used in combination with a filler such as silica, an extender pigment such as organic beads, a neutralizer, a surfactant, and the like.

Examples of binding resins include hydrophilized polyester-based urethane resins, and the like, which can be used in combination with polyesters, polyacrylates, polyvinyl acetate, polybutadiene, polyvinyl chloride, chlorinated polypropylene, polyethylene, polystyrene, polystyrene-acrylate copolymers, rosin derivatives, alcohol adducts of styrene-maleic anhydride copolymers, cellulose-based resins, and the like. Specific examples of usable binding resins include polyacrylamide-based resins, poly(meth)acrylate-based resins, polyethylene oxide-based resins, poly N-vinyl-pyrrolidone-based resins, water-soluble polyester-based resins, water-soluble polyamide-based resins, water-soluble amino-based resins, water-soluble phenolic resins, and other water-soluble synthetic resins; water-soluble natural polymers such as polynucleotides, polypeptides, and polysaccharides; and the like. Other examples include natural rubber, synthetic rubber, polyvinyl acetate-based resins, (meth)acrylic based-resins, polyvinyl chloride-based resins, modified polyurethane-polyacrylic-based resins, mixtures of natural rubber etc. mentioned above, and other resins. Such binding resins may be used singly or in a combination of two or more.

Examples of solvents (or dispersion media) include petroleum-based organic solvents, such as hexane, heptane, octane, toluene, xylene, ethylbenzene, cyclohexane, and methylcyclohexane; ester-based organic solvents, such as ethyl acetate, butyl acetate, 2-methoxyethyl acetate, and 2-ethoxyethyl acetate; alcohol-based organic solvents, such as methyl alcohol, ethyl alcohol, normal propyl alcohol, isopropyl alcohol, isobutyl alcohol, ethylene glycol, and propylene glycol; ketone-based organic solvents, such as acetone, methyl ethyl ketone, methyl isobutyl ketone, and cyclohexanone; ether-based organic solvents, such as diethyl ether, dioxane, and tetrahydrofuran; chlorine-based organic solvents, such as dichloromethane, carbon tetrachloride, trichloroethylene, and tetrachloroethylene; inorganic solvents, such as water; and the like. These solvents (or dispersion media) may be used singly or in a combination of two or more.

Examples of printing methods for forming the picture pattern layer include gravure printing, offset printing, screen printing, flexo printing, electrostatic printing, ink jet printing, and the like. When a solid-like picture pattern layer is formed over the entire surface, various coating methods, such as roll coating, knife coating, air knife coating, die coating, lip coating, comma coating, kiss coating, flow coating, and dip coating, can be used. In addition to the above, examples of usable methods include hand-drawing methods, marbling methods, photographic methods, transfer methods, laser beam drawing methods, electron beam drawing methods, metal partial deposition methods, etching methods, and the like. Such methods may be used in combination with other methods.

The thickness of the picture pattern layer is not particularly limited, and can be appropriately selected according to the characteristics of the product. The layer thickness is about 0.1 to 15 μm.

Transparent Adhesive Layer

In order to increase the adhesion between the picture pattern layer and a transparent resin layer or surface-protecting layer, described later, a transparent adhesive layer may be formed on the picture pattern layer. The transparent adhesive layer is not particularly limited as long as it is transparent. This layer may be colorless transparent, colored transparent, translucent, or the like.

The adhesive is not particularly limited, and adhesives known in the field of decorative sheets can be used. Examples of adhesives known in the field of decorative sheets include thermoplastic resins, such as polyamide resin, acrylic resin, and vinyl acetate resin; thermosetting resins, such as urethane-based resin; and the like. These adhesives may be used singly or in a combination of two or more. Further, two-component curable polyurethane resins or polyester resins using isocyanate as a curing agent can also be applied.

The thickness of the transparent adhesive layer is not particularly limited, but is about 0.1 to 30 μm, and preferably about 1 to 20 μm.

Transparent Resin Layer

The transparent resin layer is a layer that can be optionally provided, and is not particularly limited as long as it is transparent. This layer may be colorless transparent, colored transparent, translucent, or the like. Although the material of the transparent resin layer is not limited, a non-halogen-based thermoplastic resin is preferably contained.

Examples of the non-halogen-based thermoplastic resin include olefin-based thermoplastic resins, such as low-density polyethylene (including linear low-density polyethylene), medium-density polyethylene, high-density polyethylene, ethylene-α-olefin copolymers, homopolypropylene, polymethylpentene, polybutene, ethylene-propylene copolymers, propylene-butene copolymers, ethylene-vinyl acetate copolymers, saponified ethylene-vinyl acetate copolymers, or mixtures thereof; thermoplastic ester-based resins, such as polyethylene terephthalate, polybutylene terephthalate, polyethylene naphthalate, polyethylene naphthalate-isophthalate copolymers, polycarbonate, and polyarylate; acrylic thermoplastic resins, such as methyl polymethacrylate, ethyl polymethacrylate, ethyl polyacrylate, and butyl polyacrylate; polyamide-based thermoplastic resins, such as nylon-6 and nylon-66; polyimide, polyurethane, polystyrene, acrylonitrile-butadiene-styrene resins, and the like. These non-halogen-based thermoplastic resins may be used singly or in a combination of two or more. Of these, olefin-based thermoplastic resins are preferable because they have excellent embossing properties and are inexpensive.

The transparent resin layer may be colored as long as it is transparent.

Further, the transparent resin layer may contain, as needed, various kinds of additives, such as flame retardants, lubricants, antistatic agents, antioxidants, ultraviolet absorbers, and light stabilizers, as long as it is transparent.

The thickness of the transparent resin layer is not limited, but is preferably 40 μm or more and 300 μm or less, more preferably 60 μm or more and 200 μm or less, and most preferably 60 μm or more and 100 μm or less. When the thickness of the transparent resin layer is set within the above range, deep embossing can be formed, and it is easy to obtain an effect of suppressing the occurrence of scratches and scraping (egara torare in Japanese) due to the wear of the picture pattern layer.

Primer Layer

A primer layer for a surface-protecting layer may be provided on the transparent resin layer. The primer layer can increase the adhesion between the transparent resin layer and a surface-protecting layer, described later, and can also increase the bending workability and scratch resistance of the decorative sheet when combined with the surface-protecting layer. The primer layer is not particularly limited as long as it is transparent. This layer may be colorless transparent, colored transparent, translucent, or the like.

The primer layer can be formed by applying a known primer agent to the surface of the transparent resin layer.

Examples of primer agents include urethane resin-based primer agents comprising an acrylic-modified urethane resin (acrylic urethane-based copolymer resin), a polycarbonate-based acrylic urethane copolymer resin, etc.; primer agents comprising a urethane-cellulose-based resin (e.g., a resin obtained by adding hexamethylene diisocyanate to a mixture of urethane and nitrocellulose); resin-based primer agents comprising a block copolymer of acrylic and urethane; and the like. Among these, urethane resin-based primer agents comprising a polycarbonate-based acrylic urethane copolymer resin can be preferably used, from the viewpoint of scratch resistance and weather resistance.

The primer agent may contain additives, as needed. Examples of additives include weather-resistant agents, such as ultraviolet absorbers and light stabilizers; fillers, such as silica, calcium carbonate, and clay; flame retardants, such as magnesium hydroxide; antioxidants; lubricants; foaming agents; and the like. The amount of additives to be mixed can be appropriately selected according to the characteristics of the product.

Among the above additives, examples of ultraviolet absorbers include benzophenone-based ultraviolet absorbers, benzotriazole-based ultraviolet absorbers, triazine-based ultraviolet absorbers, and the like. Preferable light stabilizers are, for example, hindered amine-based light stabilizers (HALS). The contents of these weather-resistant agents are not limited, and the amount of each of the ultraviolet absorber and light stabilizer may be about 1000 to 100000 weight ppm. In the present invention, it is particularly preferable to use a triazine-based ultraviolet absorber and/or a hindered amine-based light stabilizer.

The thickness of the primer layer is not limited, but is preferably 0.5 μm or more and 12 μm or less, and more preferably 1 μm or more and 8 μm or less. When the thickness of the primer layer is set within the above range, the bending workability and scratch resistance of the decorative sheet can be more likely increased due to the combination with a surface-protecting layer, described later. Further, additives such as weather-resistant agents can be easily contained, and weather resistance can be easily imparted to the decorative sheet of the present invention.

Surface-Protecting Layer

The decorative sheet of the present invention has a first surface-protecting layer as the outermost layer. As long as the first surface-protecting layer serves as the outermost layer of the decorative sheet, the surface-protecting layer may have a single-layer structure with the first surface-protecting layer alone, as shown in FIG. 1-1, or a multi-layer structure including the first surface-protecting layer (particularly a double-layer structure with a first surface-protecting layer and a second surface-protecting layer), as shown in FIG. 1-2. In the case of a multi-layer structure (particularly a first surface-protecting layer and a second surface-protecting layer), although the details are described later, when a second surface-protecting layer that is less hard (relatively softer) than the first surface-protecting layer is provided adjacent to the first surface-protecting layer, it is possible to further limit the occurrence of breakage and cracks when an impact is applied to the surface-protecting layer or during processing, and it is also possible to increase the scratch resistance particularly under high load conditions. The surface-protecting layer is not particularly limited as long as it is transparent. This layer may be colorless transparent, colored transparent, translucent, or the like.

The first surface-protecting layer is characterized by:
(1) comprising an ionizing radiation-curable resin containing two kinds of aliphatic urethane acrylates, i.e., resins A and B, wherein resin A is an aliphatic urethane acrylate with an isocyanurate skeleton, and resin B is an aliphatic urethane acrylate with an alicyclic skeleton without an isocyanurate skeleton; and
(2) having a nanoindentation hardness of 160 MPa or more and 240 MPa or less.

Further, when a second surface-protecting layer is provided, it is preferable that the second surface-protecting layer be relatively less hard than the first surface-protecting layer. For example, it is preferable to use a second surface-protecting layer having a nanoindentation hardness of 100 MPa or more and 240 MPa or less, where the nanoindentation hardness is less than that of the first surface-protecting layer.

In the decorative sheet of the present invention, when the first surface-protecting layer satisfies the above requirements, the first surface-protecting layer has excellent contamination resistance, alkali resistance, etc., for a long period of time, while limiting the occurrence of breakage and cracks when an impact is applied thereto or during processing. Further, when a second surface-protecting layer is provided below and adjacent to the first surface-protecting layer, it is possible to further limit the occurrence of breakage and cracks when an impact is applied to the surface-protecting layer or during processing, and it is also possible to increase the scratch resistance particularly under high load conditions.

The resin components contained in the first surface-protecting layer include an ionizing radiation-curable resin, and specifically in the present invention, include two kinds of aliphatic urethane acrylates, i.e., resins A and B.

Resin A is an aliphatic urethane acrylate with an isocyanurate skeleton, and is not limited as long as this requirement is satisfied. For example, an aliphatic urethane acrylate with an isocyanurate skeleton formed from a trimer of a diisocyanate is preferable. Specific examples include a trimer of hexamethylene diisocyanate (particularly 1,6-hexamethylene diisocyanate), a trimer of tolylene diisocyanate, a trimer of meta-xylene diisocyanate, and the like. Since tolylene diisocyanate and meta-xylene diisocyanate have a benzene ring, their weather resistance may be inferior to that of hexamethylene diisocyanate. Therefore, these diisocyanates are preferably hydrogenated. These resins A are effective to enhance the contamination resistance, alkali resistance, etc., of the first surface-protecting layer.

Resin B is an aliphatic urethane acrylate with an alicyclic skeleton without an isocyanurate skeleton, and is not limited as long as this requirement is satisfied. For example, the alicyclic skeleton is preferably at least one of isophorone and cyclohexane. Specific examples include those in which an acrylate is added to the end of a urethane oligomer, which is a polymer containing isophorone diisocyanate and butanediol as monomers, PG-modified diacrylate of hydrogenated dicyclohexylmethane diisocyanate (hydrogenated MDI), and the like. These resins B are effective to impart flexibility to the first surface-protecting layer, and when combined with resin A, impart, to the first surface-protecting layer, contamination resistance, alkali resistance, etc., that are excellent for a long period of time, and an effect of limiting the occurrence of breakage and cracks when an impact is applied or during processing.

All of the resin components contained in the first surface-protecting layer can be substantially composed of an ionizing radiation-curable resin, and the ionizing radiation-curable resin may be substantially composed of two kinds of aliphatic urethane acrylates, i.e., resins A and B. As with resins A and B, the ionizing radiation-curable resin is a transparent resin comprising, as a main component, a prepolymer (including an oligomer) and/or a monomer containing, in the molecule, a radically polymerizable double bond that can undergo a crosslinking polymerization reaction by ionizing radiation, such as irradiation with ultraviolet rays or electron beams. The curing reaction is usually a crosslinking curing reaction. Electromagnetic waves or charged particles having energy high enough to cause the curing reaction of molecules of ionizing radiation-curable resin (composition) are used as the ionizing radiation to cure the ionizing radiation-curable resin. Ultraviolet rays or electron beams may usually be used. Visible light, X-rays, ionic rays, or the like may also be used. In the present invention, it is preferable to use, among the ionizing radiation-curable resins, electron beam-curable resins, from the viewpoints that the properties of the raw material resin can be directly reflected in the properties of the first surface-protecting layer because a photopolymerization initiator is not contained, and that the range of choices is widened when weather-resistant agents are used in combination.

The content ratio of resins A and B in the ionizing radiation-curable resin is not limited. When the total amount of resins A and B is 100 mass %, it is preferable that the amount of resin A be 10 to 50 mass %, while the amount of resin B be 50 to 90 mass %; and it is more preferable that the amount of resin A be 20 to 40 mass %, while the amount of resin B be 60 to 80 mass %. In addition, in the decorative sheet of the present invention, the first surface-protecting layer is required to have a nanoindentation hardness of 160 MPa or more and 240 MPa or less (preferably 180 MPa or more and 220 MPa or less); however, within the content ratio of resins A and B mentioned above, the first surface-protecting layer is likely to have such a nanoindentation hardness. The hardness of the first surface-protecting layer can be adjusted, for example, by controlling the content ratio of resins A and B, or by suitably controlling the irradiation conditions (intensity, time, etc.) of ultraviolet rays or electron beams, which are ionizing radiation.

In the present invention, the hardness of the surface-protecting layer (first surface-protecting layer and second surface-protecting layer) is indicated by nanoindentation hardness ($H_{IT}$) measured with a TriboIndenter (registered trademark) TI-950 tester for surface film physical properties (Hysitron). The measurement method is as described below.

Figure 3:
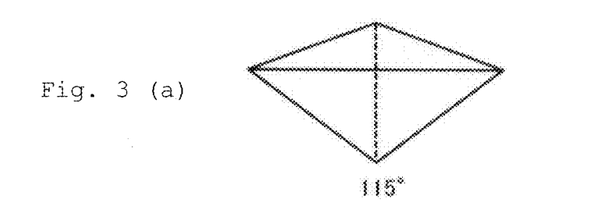

(1) A Berkovich indenter, shown in FIG. 3(*a*), is pushed into a measurement sample as shown in FIG. 3(*b*) under the indentation conditions described below, and "a projected contact area (Ap) (mm$^2$) corrected in accordance with the instrument standard" is calculated from the geometrical shape of triangular pyramid impression formed on the surface. The maximum test load ($F_{max}$) is divided by the value Ap to determine the hardness.

Specifically, $H_{IT}=F_{max}/Ap$.

(2) The indentation conditions are as follows: first, as shown in FIG. 3(*c*), a load of 0 to 100 μN is applied over 10 seconds (i.e., 10 μN/s) at room temperature (laboratory environment temperature). Second, the layers are maintained with application of a load of 100 μN ($F_{max}$) for 5 seconds. Finally, unloading from 100 to 0 μN is performed over 10 seconds.

Ap is calculated from $24.50[h_{max}-\varepsilon(h_{max}-h_r)]^2$ ($\varepsilon$ indicates a correction factor due to the geometric shape of the indenter, and $h_r$ indicates the depth of the geometrical shape of triangular pyramid impression remaining on the surface after unloading).

(3) In measuring the hardness, to avoid the impact from the hardness of layers other than the layer that serves as a measurement sample, the hardness of the cross-sectional surface of the surface-protecting layer is measured. Specifically, a decorative sheet is embedded in a resin (cold curing-type epoxy two-component curable resin), and left to stand at room temperature for at least 24 hours to be cured. The cured, embedded sample is subjected to mechanical polishing to expose the cross-sectional surface of the surface-protecting layer. The Berkovich indenter is impressed into the cross-sectional surface of the surface-protecting layer (at the position at which microparticles are not present if microparticles, such as of inorganic filler, are contained in the layer) to measure the hardness of the cross-sectional surface of the surface-protecting layer.

When a second surface-protecting layer is provided, it is preferable that the hardness of the second surface-protecting layer be relatively less than that of the first surface-protecting layer. The resin components that constitute the second surface-protecting layer are not particularly limited. For example, the second surface-protecting layer is preferably configured from resin B alone, or a mixture of resin B and resin C (a pentaerythritol-based polyfunctional acrylate without an isocyanurate skeleton and an alicyclic skeleton). Specific examples of resin C include pentaerythritol tetraacrylate, dipentaerythritol pentaacrylate, and the like. Due to the presence of resin B, the second surface-protecting layer can also be cured by irradiation with ionizing radiation; thus, it can be formed by curing simultaneously with the first surface-protecting layer.

The content ratio of resins B and C, among the resin components that form the second surface-protecting layer, is not limited. When the total amount of resins B and C is 100 mass %, it is preferable that the amount of resin B be 70 to 100 mass %, while the amount of resin C be 0 to 30 mass %; and it is more preferable that the amount of resin B be 80 to 90 mass %, while the amount of resin C be 10 to 20 mass %. Further, in the decorative sheet of the present invention, the nanoindentation hardness of the second surface-protecting layer is preferably 100 MPa or more and 240 MPa or less (more preferably 140 MPa or more and 215 MPa or less), which is relatively less than that of the first surface-protecting layer; however, within the content ratio of resins B and C mentioned above, the second surface-protecting layer is likely to have such a nanoindentation hardness. The hardness of the second surface-protecting layer can also be adjusted, for example, by suitably controlling the irradiation conditions (intensity, time, etc.) of ultraviolet rays or electron beams, which are ionizing radiation.

In order to improve the weather resistance, it is preferable to add ultraviolet absorbers, such as benzotriazole-based ultraviolet absorbers, benzophenone-based ultraviolet absorbers, salicylate-based ultraviolet absorbers, and triazine-based ultraviolet absorbers, to the surface-protecting layer.

When the resin layer is cured by irradiation with ultraviolet rays, acetophenones, benzophenones, Michler's benzoyl benzoates, α-amino oxime esters, tetramethylthiuram monosulfide, thioxanthones, aromatic diazonium salts, aromatic sulfonium salts, metallocenes, etc., can be used as a photopolymerization initiator; and n-butylamine, triethylamine, tri-n-butylphosphine, etc., can be used as a photopolymerization accelerator (sensitizer).

In addition, an antibacterial agent may be added to the surface-protecting layer in order to impart antibacterial properties. Antibacterial agents include inorganic antibacterial agents and organic antibacterial agents. Inorganic antibiotic agents are particularly desirable because they are generally safer, more durable, and more heat-resistant than organic antibiotic agents. Inorganic antibacterial agents are agents in which antibacterial metals, such as silver, copper, and zinc, are supported on various inorganic carriers. The amount of the antibacterial agent added is preferably 0.1 to 10 parts by mass per 100 parts by mass of the resin components.

The surface-protecting layer may also contain colorants such as dyes and pigments, fillers such as inorganic fillers, antifoaming agents, leveling agents, thixotropy-imparting agents, flame retardants, and other various additives. Inorganic fillers are often used as matting agents; when the surface-protecting layer contains an inorganic filler, the effect of limiting the curing shrinkage of the surface-protecting layer can also be expected. Therefore, in the present invention, the inorganic filler is preferably surface-treated (hydrophobized).

Examples of inorganic fillers include silica, aluminum oxide, silicon carbide, silicon dioxide, calcium titanate, barium titanate, magnesium pyroborate, zinc oxide, silicon nitride, zirconium oxide, chromium oxide, iron oxide, boron nitride, diamond, emery, glass fiber, and the like.

The method for surface-treating (hydrophobizing) the inorganic filler is not particularly limited, and a known method can be used. Examples include a method of hydrophobizing the inorganic filler with a silicone oil-based treatment agent; a method of treating the inorganic filler with an alkylsilazane-based treatment agent, a trimethylsilylating agent, and/or alkoxysilane, and then hydrophobizing the inorganic filler with a silicone oil-based treatment agent mentioned above; a method of hydrophobizing the inorganic filler with a silicone oil-based treatment agent, further followed by treatment with a trimethylsilylating agent or an alkylsilazane-based treatment agent; a method of hydrophobizing the inorganic filler with alkoxysilane; a method of treating the inorganic filler with alkoxysilane, further followed by treatment with a silicone oil-based treatment agent or with a silicone oil-based treatment agent and alkoxysilane; a method of treating the inorganic filler with a dimer diol siloxane and/or trimethylsilanol or cyclic siloxane; and the like. In addition to these hydrophobization methods, usable methods include hydrophobization methods using various coupling agents, such as silane coupling agents, titanate-based coupling agents, and aluminate-based coupling agents; phosphoric acid-based surfactants and fatty acid-based surfactants; or fat, stearic acid, etc. Hereinafter, each of the above-mentioned products for hydrophobizing the untreated inorganic filler (e.g., all of the treatment agents such as silicone oil-based treatment agents, silane coupling agents, and surfactants) are collectively referred to as "hydrophobizing agents."

The method for hydrophobizing the inorganic filler with a hydrophobizing agent is not particularly limited, and a known method can be used. Examples include a method of adding (e.g., spraying) a stock solution of the hydrophobizing agent or a diluted solution of the hydrophobizing agent in water or an organic solvent to the untreated inorganic filler (dry treatment method); a method of treating (e.g., immersing) the untreated inorganic filler in a stock solution of the hydrophobizing agent, a hydrophobizing agent-containing aqueous solution, or a hydrophobizing agent-containing organic solvent, followed by drying (wet treatment method); and the like. As a result of such treatment, a part or all of the surface of the inorganic filler is coated with the hydrophobizing agent (a), absorbs the hydrophobizing agent (b), or is coated with and absorbs the hydrophobizing agent (c) (combination of (a) and (b)). As a result, a hydrophobized inorganic filler is obtained. The hydrophobizing agents may be used singly or in a combination of two or more.

The surface-protecting layer can be formed, for example, by applying a coating agent containing the specific ionizing radiation-curable resin described above to the primer layer by a known coating method, such as a gravure coating or roll coating, and then curing the resin. When a second surface-protecting layer is formed, for example, after the second surface-protecting layer is formed on the primer layer, the first surface-protecting layer can be subsequently formed; alternatively, after coating films for forming the surface-protecting layers are laminated, the coating films may be cured by irradiation with ionizing radiation at the same time to form each surface-protecting layer.

The thickness of the first surface-protecting layer is not limited, but is preferably 3 μm or more and 30 μm or less, and more preferably 10 μm or more and 15 μm or less. When the thickness of the first surface-protecting layer is set within the above range, bending workability and scratch resistance can be easily imparted to the decorative sheet of the present invention due to the combination with the primer layer described above.

The thickness of the second surface-protecting layer is not limited, but is preferably 5 μm or more and 15 μm or less, and more preferably 10 μm or more and 12 μm or less. When the thickness of the second surface-protecting layer is set within the above range, due to the combination with the first surface-protecting layer, it is possible to further limit the occurrence of breakage and cracks when an impact is applied to the surface-protecting layer or during processing, and it is also possible to increase the scratch resistance particularly under high load conditions.

When a second surface-protecting layer is formed, it is preferable that, for example, at the stage of applying a resin composition that forms the second surface-protecting layer to the primer layer, the coating film be tack-free (low adhesive). If the coating film is tack-free, even if the second surface-protecting layer is rolled up and temporarily stored before the first surface-protecting layer is formed, without semi-curing by irradiation with ionizing radiation, high-temperature baking, or the like, the risk of blocking (offset) to other layers can be reduced. Further, if the coating film is tack-free, the step of laminating the first surface-protecting layer can be performed smoothly. The second surface-protecting layer can be made tack-free during coating by suitably adjusting the weight average molecular weight of the resin components forming the second surface-protecting layer, or by adding an inorganic filler.

Embossing

The embossing is conducted to impart a desired texture, such as wood-grain patterns, to the decorative sheet. The embossing may be applied onto the transparent resin layer and/or the surface-protecting layer. For example, after the surface-protecting layer is softened by heating, the softened surface-protecting layer is pressed and shaped by using an embossing plate having a desired projection and depression pattern, and the surface-protecting layer is then solidified by cooling to provide a texture. The embossing may be conducted using a known sheet-fed embossing machine or rotary embossing machine.

Examples of the projection and depression patterns applied by embossing include wood-grain vessel patterns, bosses (projection and depression patterns of annual rings that stand out), hairline patterns, grain patterns, matte patterns, and the like.

When embossing is applied, ink may be filled into the embossed depression portions by wiping as needed. For example, ink may be filled into the embossed depression portions while plowing the surface thereof with a doctor blade. Ink containing a two-component curable urethane resin as a binder can usually be used as the ink to be filled (wiping ink). In particular, when a wood-grain vessel-like projection and depression pattern is subjected to wiping, a design more close to actual wood grain can be attained, thus increasing the value of the product.

Back-Side Primer Layer

A back-side primer layer may be provided, as needed, on the back surface of the base material sheet. This is effective, for example, when a decorative plate is produced by bonding a base material sheet and a decorative plate base.

The back-side primer layer can be formed by applying a known primer agent to the base material sheet. Examples of primer agents include urethane resin-based primer agents comprising an acrylic-modified urethane resin (acrylic urethane-based copolymer resin), a polycarbonate-based acrylic urethane copolymer resin, etc.; primer agents comprising a urethane-cellulose-based resin (e.g., a resin obtained by adding hexamethylene diisocyanate to a mixture of urethane and nitrocellulose); resin-based primer agents comprising a block copolymer of acrylic and urethane; and the like.

The primer agent may contain additives, as needed. Examples of additives include fillers such as calcium carbonate and clay, flame retardants such as magnesium hydroxide, antioxidants, lubricants, foaming agents, ultraviolet absorbers, light stabilizers, and the like. The amount of additives to be mixed can be appropriately selected according to the characteristics of the product.

The thickness of the back-side primer layer is not limited, but is generally 0.01 to 10 µm, and preferably about 0.1 to 1 µm.

Synthetic-Resin Backer Layer

A synthetic-resin backer layer may be provided, as needed, on the back surface of the base material sheet. Providing a synthetic-resin backer layer further increases the impact resistance of the decorative sheet. When a back-side primer layer mentioned above is also provided, the synthetic-resin backer layer and the back-side primer layer are provided in this order from the base material sheet side on the back surface of the base material sheet.

Examples of the resin that constitutes a synthetic-resin backer layer include polypropylene, ethylene-vinyl alcohol copolymers, polymethylene, polymethyl pentene, polyethylene terephthalate, highly heat-resistant polyalkylene terephthalate (e.g., polyethylene terephthalate prepared by replacing a portion of ethylene glycol with 1,4-cyclohexane dimethanol, diethylene glycol, etc.; "PET-G," trade name, Eastman Chemical Company), polybutylene terephthalate, polyethylene naphthalate, polyethylene naphthalate-isophthalate copolymers, polycarbonate, polyarylate, polyimide, polystyrene, polyamide, and ABS. These resins may be used singly or in a combination of two or more.

The thickness of the synthetic-resin backer layer is preferably 0.1 to 0.6 mm, more preferably 0.15 to 0.45 mm, and still more preferably 0.20 to 0.40 mm. A lower limit of the thickness of the synthetic-resin backer layer within these ranges further increases the impact resistance of the decorative sheet. An upper limit of the thickness of the synthetic-resin backer layer within these ranges further reduces or prevents the warpage of the decorative sheet.

The nanoindentation hardness of the synthetic-resin backer layer is preferably 60 MPa or more and 300 MPa or less, and more preferably 130 MPa or more and 250 MPa or less, from the viewpoint of imparting excellent impact resistance to the decorative material. The method for measuring the nanoindentation hardness of the synthetic-resin backer layer is the same as the method for measuring the nanoindentation hardness of the surface-protecting layer described above. Further, the nanoindentation hardness of the synthetic-resin backer layer can be controlled by adjusting the type of resin that constitutes the synthetic-resin backer layer, or when two or more resins are contained, by adjusting the content ratio thereof.

Formation of Various Additives Contained in Layers of Decorative Sheet into Vesicles The various additives to be added to the layers of the decorative sheet of the present invention described above (e.g., inorganic fillers to be added to the primer layer and the surface-protecting layer) are preferably formed into vesicles. Examples of the method for forming various additives into vesicles are not particularly limited, and known methods may be used to form the vesicles. Among various methods, the supercritical reverse phase evaporation method is preferable.

The supercritical reverse phase evaporation method is specifically explained below. The supercritical reverse phase evaporation method refers to a method of adding an aqueous phase containing various additives as water-soluble or hydrophilic encapsulation materials to a mixture in which a material for forming the outer membrane of the vesicle is evenly dissolved in carbon dioxide in a supercritical state or carbon dioxide at a temperature or a pressure condition equal to or greater than the supercritical point, thereby forming a capsule-like vesicle in which the various additives as encapsulation materials are encapsulated with a single membrane. "Carbon dioxide in a supercritical state" refers to carbon dioxide in a supercritical state at a temperature equal to or greater than the critical temperature (30.98° C.), and a pressure equal to or greater than the critical pressure (7.3773±0.0030 MPa); and "carbon dioxide at a temperature or a pressure condition equal to or greater than the critical point" refers to carbon dioxide under a condition in which only the critical temperature or only the critical pressure exceeds the critical condition. This method can produce a single-walled lamellar vesicle having a diameter of 50 to 800 nm. "Vesicle" is the general name of a folliculus having a spherically closed membrane structure containing a liquid phase. In particular, those having an outer membrane formed of a biological lipid, such as a phospholipid, are called "liposomes."

Examples of phospholipids include phosphatidylcholine, phosphatidylethanolamine, phosphatidylserine, phosphatidic acid, phosphatidylglycerol, phosphatidylinositol, cardiolipin, egg yolk lecithin, hydrogenated egg yolk lecithin, soybean lecithin, hydrogenated soybean lecithin, and like glycerophospholipids; and sphingomyelin, ceramide phosphorylethanolamine, ceramide phosphorylglycerol, and like sphingophospholipids.

Other examples of the materials constituting the outer layer include nonionic surfactants; and dispersants, such as a mixture of these surfactants and cholesterols or triacylglycerols.

Examples of nonionic surfactants include one or more members selected from polyglycerolether, dialkylglycerol, polyoxyethylene hardened castor oil, polyoxyethylene alkylether, polyoxyethylene sorbitan fatty acid ester, sorbitan fatty acid ester, polyoxyethylene polyoxypropylene copolymers, polybutadiene-polyoxyethylene copolymers, polybutadiene-poly2-vinylpyridine, polystyrene-polyacrylic acid copolymers, polyethylene oxide-polyethyl ethylene copolymers, polyoxyethylene-polycaprolactam copolymers, and the like.

Examples of the cholesterols include one or more members selected from cholesterol, α-cholestanol, β-cholestanol, cholestane, desmosterol (5,24-cholestadiene-3β-ol), sodium cholate, cholecalciferol, and the like.

The outer membrane of the liposome may be formed from a mixture of a phospholipid and a dispersant. By forming an outer layer as a liposome formed of a phospholipid, the decorative sheet of the present invention ensures desirable compatibility between the resin composition, which is the main component of each layer, and various additives.

2. Decorative Plate

The decorative plate of the present invention comprises a laminate comprising, in sequence in the thickness direction, a decorative plate base and the decorative sheet of the present invention.

Figure 2:
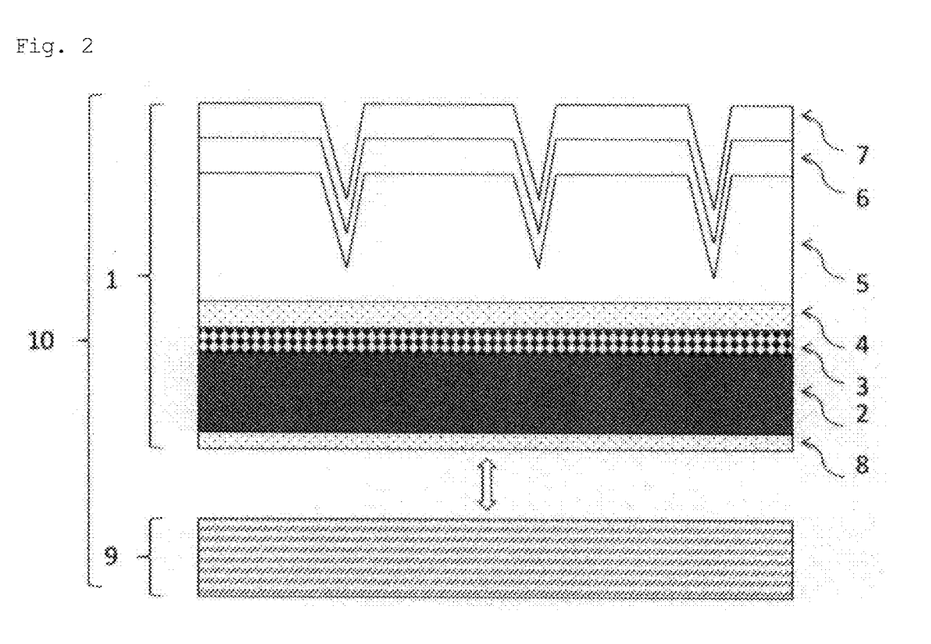
FIG. 2 is a cross-sectional view schematically showing an example of the components of the decorative plate of the present invention.

FIG. 2 shows an example of a decorative plate 10 in which the decorative sheet 1 of the present invention is laminated on a decorative plate base 9 in this order (the surface opposite the surface-protecting layer side of the decorative sheet 1 is bonded together with the decorative plate base 9).

The decorative plate base is, although not limited to, for example, at least one member selected from medium-density wood fiberboards, high-density wood fiberboards, particleboards, coniferous tree plywood, broadleaf tree plywood, fast-growing plywood, cork sheets, cork-containing composite base materials, thermoplastic resin sheets (resin plates containing polyvinyl chloride resin, polypropylene resin, polyethylene resin, acrylic resin, ABS resin, etc., as its main component or those obtained by foaming these resin plates), and the like. These decorative plate bases may be used singly, or two or more of these decorative plate bases may be combined and laminated for use.

Examples of coniferous trees include Sakhalin fir, Japanese larch, Yezo spruce, Japanese cedar, hinoki cypress, pine, sequoia, and Hondo spruce. Examples of broadleaf trees include lauan, Japanese linden, birch, castor aralia, Japanese beech, oak, and meranti. Examples of fast-growing trees include poplar, falcata, acacia, Kamerere, eucalyptus, and Terminalia.

When a plywood, such as a coniferous tree plywood, broadleaf tree plywood, or fast-growing plywood, is used, the number of laminated plywood layers (number of plies) is not limited. Typically, it is preferable that the number of plies be 3 to 7, and more preferably 5 to 7. The adhesive for use in producing plywood is also not limited. A wide range of known woodworking adhesives may be used. Examples of adhesives include adhesives containing, as an active ingredient, polyvinyl acetate, polyvinyl chloride, vinyl chloride-vinyl acetate copolymers, ethylene-acrylic acid copolymers, ionomers, butadiene-acrylonitrile rubber, neoprene rubber, and natural rubber. Examples also include heat-curable adhesives, such as melamine-based adhesives, phenol-based adhesives, and urea-based (e.g., vinyl acetate-urea-based) adhesives.

The cork sheet usable here is not only so-called natural cork, which is a highly elastic material obtained by peeling and processing the cork tissue of cork oak bark, but also so-called synthetic cork made to resemble cork. The cork sheet may be a single layer, or may be a laminate of cork sheets having different elastic moduli and/or densities.

Examples of the cork-containing composite base material include composite materials obtained by laminating and bonding a cork sheet and other materials (e.g., medium-density wood fiberboards and high-density wood fiberboards).

The thickness of the decorative plate base is not limited, and is preferably about 2 to 15 mm, and more preferably about 2 to 12 mm.

The method for laminating the decorative sheet and the decorative plate base is not limited. For example, the decorative sheet can be bonded to the decorative plate base using an adhesive. The adhesive may be suitably selected from known adhesives according to, for example, the type of the adherend. Examples thereof include urethane, acrylic, urethane-acrylic, polyvinyl acetate, polyvinyl chloride, vinyl chloride-vinyl acetate copolymers, ethylene-acrylic acid copolymers, ionomers, butadiene-acrylonitrile rubber, neoprene rubber, and natural rubber. These adhesives may be used singly or in a combination of two or more.

In the decorative sheet of the present invention described above, the surface-protecting layer has excellent contamination resistance, alkali resistance, etc., for a long period of time, while limiting the occurrence of breakage and cracks when an impact is applied thereto or during processing. Therefore, the decorative sheet of the present invention is also resistant to bending processing (wrapping processing) in the production of a decorative material using the decorative sheet. Decorative plates obtained by bonding the decorative sheet of the present invention to decorative plate bases, and then performing, for example, V-cut processing from the decorative plate base side, followed by bending processing can be preferably used for various applications. Further, the obtained decorative plates have excellent contamination resistance, alkali resistance, etc., and thus can be preferably used as floor materials to which liquid substances and various chemicals (e.g., hair dyes) used in daily life easily contact. That is, the decorative sheet and decorative plate of the present invention are preferable as a decorative sheet for floors and a decorative material for floors, respectively.

3. Surface-Protecting Layer-Forming Coating Agent

The present invention also includes an invention of a coating agent for forming the surface-protecting layer (particularly the first surface-protecting layer) that constitutes the decorative sheet. Specifically, the coating agent of the present invention is characterized by comprising an ionizing radiation-curable resin containing two kinds of aliphatic urethane acrylates, i.e., resins A and B, wherein resin A is an aliphatic urethane acrylate with an isocyanurate skeleton, and resin B is an aliphatic urethane acrylate with an alicyclic skeleton without an isocyanurate skeleton. This coating agent is suitable for forming the surface-protecting layer contained in the decorative sheet or decorative plate of the present invention in the production thereof.

The coating agent of the present invention contains resins A and B, and additives that can be contained in the surface-protecting layer. The viscosity of the coating agent is adjusted by containing a solvent as appropriate. The details of each component are the same as described above.

EXAMPLES

The present invention is described in detail below with reference to Examples, Comparative Examples, and Test Examples. However, the present invention is not limited to the contents shown in the Examples.

Example 1

A 60 μm-thick colored polypropylene film was prepared as a base material sheet. A back-side primer layer (thickness:

2 µm) was formed on the back surface of the base material sheet, and a picture pattern layer was formed on the front surface of the base material sheet by gravure printing so as to have a thickness of 2 µm. A transparent adhesive layer was formed on the picture pattern layer using a urethane-based resin so as to have a thickness of 2 µm. A transparent polypropylene-based resin sheet was laminated by extrusion lamination on the adhesive layer so as to have a thickness of 80 µm, thereby forming a transparent resin layer.

Next, after a corona discharge treatment was applied to the surface, a primer layer was formed by applying a primer agent to a thickness of 2 µm.

A surface-protecting layer-forming coating agent (mixing an ionizing radiation-curable resin with resin A with an isocyanurate skeleton and resin B with an alicyclic skeleton without an isocyanurate skeleton so that the first surface-protecting layer had a nanoindentation hardness of 160 MPa, and containing 20 parts by mass of a hydrophobized inorganic filler per 100 parts by mass of the resin components) shown in Table 1 was applied (15 µm) by gravure coating to the front surface of the primer layer. Then, an electron beam was irradiated using an electron beam irradiator in an environment with an oxygen concentration of 200 ppm or less under the conditions of an accelerating voltage of 165 KeV and 5 Mrad to cure the electron beam-curable resin, thereby forming a first surface-protecting layer. Resin A is an aliphatic urethane acrylate with an isocyanurate skeleton formed from a trimer of hexamethylene diisocyanate, and resin B is PG-modified diacrylate (without an isocyanurate skeleton) of hydrogenated dicyclohexylmethane diisocyanate (hydrogenated MDI) (the same applies hereinafter).

Example 2

A decorative sheet was obtained in the same manner as in Example 1, except that an ionizing radiation-curable resin was mixed with two kinds of resins, i.e., resin A with an isocyanurate skeleton and resin B with an alicyclic skeleton without an isocyanurate skeleton, which were aliphatic urethane acrylates, so that the first surface-protecting layer had a nanoindentation hardness of 180 MPa.

Example 3

A decorative sheet was obtained in the same manner as in Example 1, except that an ionizing radiation-curable resin was mixed with two kinds of resins, i.e., resin A with an isocyanurate skeleton and resin B with an alicyclic skeleton without an isocyanurate skeleton, so that the first surface-protecting layer had a nanoindentation hardness of 215 MPa.

Example 4

A decorative sheet was obtained in the same manner as in Example 1, except that an ionizing radiation-curable resin was mixed with two kinds of resins, i.e., resin A with an isocyanurate skeleton and resin B with an alicyclic skeleton without an isocyanurate skeleton, so that the first surface-protecting layer had a nanoindentation hardness of 240 MPa.

Example 5

A decorative sheet was obtained in the same manner as in Example 1, except that an ionizing radiation-curable resin was mixed with two kinds of resins, i.e., resin A with an isocyanurate skeleton and resin B with an alicyclic skeleton without an isocyanurate skeleton, so that the first surface-protecting layer had a nanoindentation hardness of 215 MPa, and the resultant was applied in a coating amount of 10 µm.

Comparative Example 1

A decorative sheet was obtained in the same manner as in Example 1, except that an ionizing radiation-curable resin was mixed with two kinds of resins, i.e., resin A with an isocyanurate skeleton and resin B with an alicyclic skeleton without an isocyanurate skeleton, so that the first surface-protecting layer had a nanoindentation hardness of 120 MPa.

Comparative Example 2

A decorative sheet was obtained in the same manner as in Example 1, except that an ionizing radiation-curable resin was mixed with two kinds of resins, i.e., resin A with an isocyanurate skeleton and resin B with an alicyclic skeleton without an isocyanurate skeleton, so that the first surface-protecting layer had a nanoindentation hardness of 250 MPa.

Comparative Example 3

A decorative sheet was obtained in the same manner as in Example 1, except that an ionizing radiation-curable resin was mixed with resin C without an alicyclic skeleton, which was a linear polyfunctional aliphatic urethane acrylate, and resin B with an alicyclic skeleton without an isocyanurate skeleton so that the first surface-protecting layer had a nanoindentation hardness of 215 MPa. Resin C is a pentaerythritol-based polyfunctional acrylate (without an isocyanurate skeleton and an alicyclic skeleton) (the same applies hereinafter).

Comparative Example 4

A decorative sheet was obtained in the same manner as in Example 1, except that resin A with an isocyanurate skeleton, which was an aliphatic urethane acrylate, and resin C without an alicyclic skeleton, which was a linear polyfunctional aliphatic urethane acrylate, were mixed so that the first surface-protecting layer had a nanoindentation hardness of 415 MPa, further an inorganic filler formed into vesicles was added thereto, and the resultant was applied by gravure coating in a coating amount of 15 µm and cured by irradiation using an ultraviolet ray irradiation device (high-pressure mercury lamp: output 160 W/cm²) for 2 seconds to form the first surface-protecting layer.

Example 6

A decorative sheet was obtained in the same manner as in Example 1, except that resin A with an isocyanurate skeleton and resin B with an alicyclic skeleton without an isocyanurate skeleton, which were aliphatic urethane acrylates, were mixed so that the first surface-protecting layer had a nanoindentation hardness of 240 MPa, and the resultant was applied by gravure coating in a coating amount of 15 µm and cured by irradiation using an ultraviolet ray irradiation device (high-pressure mercury lamp: output 160 W/cm²) for 2 seconds to form the first surface-protecting layer.

Example 7

A decorative sheet was obtained in the same manner as in Example 1, except that an ionizing radiation-curable resin was mixed with two kinds of resins, i.e., resin A with an isocyanurate skeleton and resin B with an alicyclic skeleton without an isocyanurate skeleton, so that the first surface-protecting layer had a nanoindentation hardness of 160 MPa, and the resultant was applied in a coating amount of 30 μm.

Example 8

A decorative sheet was obtained in the same manner as in Example 1, except that an ionizing radiation-curable resin was mixed with two kinds of resins, i.e., resin A with an isocyanurate skeleton and resin B with an alicyclic skeleton without an isocyanurate skeleton, so that the first surface-protecting layer had a nanoindentation hardness of 240 MPa, and the resultant was applied in a coating amount of 30 μm.

Example 9

A decorative sheet was obtained in the same manner as in Example 1, except that as the second surface-protecting layer, resin C without an alicyclic skeleton, which was a linear polyfunctional aliphatic urethane acrylate, and resin B with an alicyclic skeleton without an isocyanurate skeleton were mixed so that the second surface-protecting layer had a nanoindentation hardness of 140 MPa (in consideration of the adhesion with the first surface-protecting layer, an electron beam was irradiated under the condition of 1 Mrad to make a prototype), the resultant was applied in a coating amount of 12 μm, then on the upper layer, as the first surface-protecting layer, an ionizing radiation-curable resin was mixed with two kinds of resins, i.e., resin A with an isocyanurate skeleton and resin B with an alicyclic skeleton without an isocyanurate skeleton, so that the first surface-protecting layer had a nanoindentation hardness of 240 MPa, and the resultant was applied in a coating amount of 15 μm.

Example 10

A decorative sheet was obtained in the same manner as in Example 1, except that as the second surface-protecting layer, resin C without an alicyclic skeleton, which was a linear polyfunctional aliphatic urethane acrylate, and resin B with an alicyclic skeleton without an isocyanurate skeleton were mixed so that the second surface-protecting layer had a nanoindentation hardness of 215 MPa (in consideration of the adhesion with the first surface-protecting layer, an electron beam was irradiated under the condition of 1 Mrad to make a prototype), the resultant was applied in a coating amount of 12 μm, then on the upper layer, as the first surface-protecting layer, an ionizing radiation-curable resin was mixed with two kinds of resins, i.e., resin A with an isocyanurate skeleton and resin B with an alicyclic skeleton without an isocyanurate skeleton, so that the first surface-protecting layer had a nanoindentation hardness of 240 MPa, and the resultant was applied in a coating amount of 15 μm.

Example 11

A decorative sheet was obtained in the same manner as in Example 1, except that as the second surface-protecting layer, resin C without an alicyclic skeleton, which was a linear polyfunctional aliphatic urethane acrylate, and resin B with an alicyclic skeleton without an isocyanurate skeleton were mixed so that the second surface-protecting layer had a nanoindentation hardness of 270 MPa (in consideration of the adhesion with the first surface-protecting layer, an electron beam was irradiated under the condition of 1 Mrad to make a prototype), the resultant was applied in a coating amount of 12 μm, then on the upper layer, as the first surface-protecting layer, an ionizing radiation-curable resin was mixed with two kinds of resins, i.e., resin A with an isocyanurate skeleton and resin B with an alicyclic skeleton without an isocyanurate skeleton, so that the first surface-protecting layer had a nanoindentation hardness of 240 MPa, and the resultant was applied in a coating amount of 15 μm.

Example 12

A decorative sheet was obtained in the same manner as in Example 1, except that as the second surface-protecting layer, resin C without an alicyclic skeleton, which was a linear polyfunctional aliphatic urethane acrylate, and resin B with an alicyclic skeleton without an isocyanurate skeleton were mixed so that the second surface-protecting layer had a nanoindentation hardness of 80 MPa (in consideration of the adhesion with the first surface-protecting layer, an electron beam was irradiated under the condition of 1 Mrad to make a prototype), the resultant was applied in a coating amount of 12 μm, then on the upper layer, as the first surface-protecting layer, an ionizing radiation-curable resin was mixed with two kinds of resins, i.e., resin A with an isocyanurate skeleton and resin B with an alicyclic skeleton without an isocyanurate skeleton, so that the first surface-protecting layer had a nanoindentation hardness of 240 MPa, and the resultant was applied in a coating amount of 15 μm.

Example 13

A decorative sheet was obtained in the same manner as in Example 6, except that after the first surface-protecting layer was formed, a synthetic-resin backer layer was formed on the back surface of the base material sheet using a polypropylene resin sheet having a nanoindentation hardness of 130 Mpa and a thickness of 0.25 mm, and finally a back-side primer layer was formed.

Example 14

A decorative sheet was obtained in the same manner as in Example 11, except that after the second surface-protecting layer and the first surface-protecting layer were formed, a backer layer was formed on the back surface of the base material sheet using a polypropylene resin sheet having a nanoindentation hardness of 130 Mpa and a thickness of 0.25 mm, and finally a back-side primer layer was formed.

Example 15

A decorative sheet was obtained in the same manner as in Example 11, except that after the second surface-protecting layer and the first surface-protecting layer were formed, a backer layer was formed on the back surface of the base material sheet using a polypropylene resin sheet having a nanoindentation hardness of 130 Mpa and a thickness of 0.40 mm, and finally a back-side primer layer was formed.

Example 16

A decorative sheet was obtained in the same manner as in Example 11, except that after the second surface-protecting layer and the first surface-protecting layer were formed, a backer layer was formed on the back surface of the base material sheet using a polypropylene resin sheet having a nanoindentation hardness of 250 Mpa and a thickness of 0.25 mm, and finally a back-side primer layer was formed.

Production of Decorative Materials for Floors

The decorative sheets of Examples 1 to 16 and Comparative Examples 1 to 4 produced as described above were each bonded together with a wooden base material (2.7-mm MDF) using a water-based adhesive (BA-10L/BA-11B, produced by Chuo Rika Kogyo Co., Ltd., coating amount: 7 g/303 mm×303 mm square) so that the back-side primer layer side of each decorative sheet was in contact with the wooden base material, thereby producing decorative materials for floors of Examples 1 to 16 and Comparative Examples 1 to 4.

Test Example 1

The following physical properties were examined for each decorative material for floors.

Contamination Resistance

A hair dye (Men's Bigen One Push 6A (Ash Brown), produced by Hoyu Co., Ltd.) was attached to the surface of each decorative material for floors to a diameter of 3 cm. After being left at room temperature for 24 hours, the hair dye was wiped off in the order of dry wiping, water wiping, and ethanol wiping, and the degree of contamination was visually observed and evaluated.

The evaluation criteria were as follows.
++: No contamination was observed.
+: Slight contamination was observed.
−: Significant contamination was observed.

Alkali Resistance

The surface of each decorative material for floors was covered with cotton soaked with 10% sodium hydroxide on watch glass. After being left at room temperature for 24 hours, the surface was wiped in the order of dry wiping, water wiping, and ethanol wiping, and the degree of whitening was visually observed and evaluated. The evaluation criteria were as follows.
++: No whitening was observed.
+: Slight whitening was observed.
−: Significant whitening was observed.

Impact Resistance (DuPont Impact)

According to the DuPont impact test of JIS K5600-5-3 (1999), the impact resistance was evaluated by allowing an impact mold with a hemispherical tip (radius: 6.3 mm) to stand still on each decorative material for floors, and dropping a weight with a load of 500 g on the impact mold from a height of 10 cm and a height of 50 cm. Evaluation was carried out 5 times for each height, and cracks in the decorative sheet were visually confirmed and evaluated.
++: No cracks occurred in the decorative sheet (number of cracks: 0).
+: A few cracks occurred in the decorative sheet (number of cracks: 1 to 4).
−: Cracks occurred in the decorative sheet (number of cracks: 5 or more).

V-Cut Processability

The test was conducted in such a manner that a groove with a V-shaped cross section reaching the interface between the MDF and the water-based adhesive layer was provided by cutting from the back surface side of each decorative material for floors, and the plywood was bent into an L shape so as to close the groove. The processed part was visually observed and evaluated according to the following criteria. The temperature during processing was room temperature.
++: Although minute cracks occurred in the processed part of the decorative sheet, there was no appearance problem.
−: The processed part of the decorative sheet cracked, causing appearance problems.

Light Load Scratch Resistance Test (Hoffman Scratch Test)

The test was conducted using a Hoffman scratch tester produced by U.S. BYK-Gardner. Specifically, a scratch blade (7-diameter cylindrical blade) was set in contact with the surface of each decorative material for floors at an angle of 45°, and the tester was moved on each decorative material for floors. The load (spindle) was gradually increased, and the test was repeated until scratches, indentations, etc., were generated on the surface of the decorative sheet.

The evaluation criteria were as follows.
++: No scratches occurred under a load of 1000 g or more and less than 1500 g.
+: No scratches occurred under a load of 500 g or more and less than 1000 g.
−: Scratches occurred under a load of less than 500 g.

TABLE 1

| | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| First surface-protecting layer | Resin A (mass %) | 10 | 20 | 40 | 50 | 40 | 5 | 60 | 0 | 50 |
| | Resin B (mass %) | 90 | 80 | 60 | 50 | 60 | 95 | 40 | 80 | 0 |
| | Resin C (mass %) | 0 | 0 | 0 | 0 | 0 | 0 | 0 | 20 | 50 |
| | Thickness (μm) of surface-protecting layer | 15 | 15 | 15 | 15 | 10 | 15 | 15 | 15 | 15 |
| | Nanoindentation hardness (MPa) of surface-protecting layer | 160 | 180 | 215 | 240 | 215 | 120 | 250 | 215 | 415 |
| Test results | Contamination resistance | + | ++ | ++ | ++ | ++ | − | ++ | − | ++ |
| | Alkali resistance | ++ | ++ | ++ | ++ | ++ | ++ | ++ | − | ++ |
| | Impact resistance 10 cm | ++ | ++ | ++ | ++ | ++ | ++ | ++ | ++ | − |
| | Impact resistance 50 cm | ++ | ++ | ++ | + | ++ | ++ | − | ++ | − |
| | V-cut processability | ++ | ++ | ++ | ++ | ++ | ++ | ++ | ++ | − |
| | Hoffman scratch test | + | + | + | + | + | − | + | + | + |

TABLE 2

|  |  | Example 6 | Example 7 | Example 8 | Example 9 | Example 10 | Example 11 | Example 12 |
|---|---|---|---|---|---|---|---|---|
| First surface-protecting layer | Resin A (mass %) | 50 | 10 | 50 | 50 | 50 | 50 | 50 |
|  | Resin B (mass %) | 50 | 90 | 50 | 50 | 50 | 50 | 50 |
|  | Resin C (mass %) | 0 | 0 | 0 | 0 | 0 | 0 | 0 |
|  | Thickness (μm) of first surface-protecting layer | 15 | 30 | 30 | 15 | 15 | 15 | 15 |
|  | Nanoindentation hardness (MPa) of surface-protecting layer | 240 | 160 | 240 | 240 | 240 | 240 | 240 |
| Second surface-protecting layer | Resin A (mass %) | – | – | – | – | – | – | – |
|  | Resin B (mass %) | – | – | – | 90 | 80 | 70 | 100 |
|  | Resin C (mass %) | – | – | – | 10 | 20 | 30 | 0 |
|  | Thickness (pm) of second surface-protecting layer | – | – | – | 12 | 12 | 12 | 12 |
|  | Nanoindentation hardness (MPa) of surface-protecting layer | – | – | – | 140 | 215 | 270 | 80 |
| Test results | Contamination resistance | ++ | ++ | ++ | ++ | ++ | ++ | + |
|  | Alkali resistance | ++ | ++ | ++ | ++ | ++ | ++ | + |
|  | Impact resistance  10 cm | ++ | + | + | ++ | ++ | + | ++ |
|  | 50 cm | + | + | + | + | + | + | + |
|  | V-cut processability | ++ | ++ | ++ | ++ | ++ | ++ | ++ |
|  | Hoffman scratch test | + | ++ | ++ | ++ | ++ | ++ | + |

TABLE 3

|  |  | Example 13 | Example 14 | Example 15 | Example 16 |
|---|---|---|---|---|---|
| First surface-protecting layer | Resin A (mass %) | 50 | 50 | 50 | 50 |
|  | Resin B (mass %) | 50 | 50 | 50 | 50 |
|  | Resin C (mass %) | 0 | 0 | 0 | 0 |
|  | Thickness (μm) of first surface-protecting layer | 15 | 15 | 15 | 15 |
|  | Nanoindentation hardness (MPa) of surface-protecting layer | 240 | 240 | 240 | 240 |
| Second surface-protecting layer | Resin A (mass %) | – | – | – | – |
|  | Resin B (mass %) | – | 70 | 70 | 70 |
|  | Resin C (mass %) | – | 30 | 30 | 30 |
|  | Thickness (μm) of second surface-protecting layer | – | 12 | 12 | 12 |
|  | Nanoindentation hardness (MPa) of surface-protecting layer | – | 270 | 270 | 270 |
| Backer layer | Thickness (mm) of backer layer | 0.25 | 0.25 | 0.4 | 0.25 |
|  | Nanoindentation hardness (MPa) of backer layer | 130 | 130 | 130 | 250 |
| Test results | Contamination resistance | ++ | ++ | ++ | ++ |
|  | Alkali resistance | ++ | ++ | ++ | ++ |
|  | Impact resistance  10 cm | ++ | ++ | ++ | ++ |
|  | 50 cm | ++ | + | + | + |
|  | V-cut processability | ++ | ++ | ++ | ++ |
|  | Hoffman scratch test | + | ++ | ++ | ++ |

Resin A: Aliphatic urethane acrylate with an isocyanurate skeleton formed from a trimer of hexamethylene diisocyanate Resin B: PG-modified diacrylate (without an isocyanurate skeleton) of hydrogenated dicyclohexylmethane diisocyanate (hydrogenated MDI)

Resin C: Pentaerythritol-based polyfunctional acrylate (without an isocyanurate skeleton and an alicyclic skeleton)

REFERENCE SIGNS LIST

1. Decorative sheet
2. Base material sheet
3. Picture pattern layer
4. Transparent adhesive layer
5. Transparent resin layer
6. Primer layer
7. Surface-protecting layer
7-1. First surface-protecting layer
7-2. Second surface-protecting layer
8. Back-side primer layer
9. Decorative plate base
10. Decorative plate
a. Thickness of surface-protecting layer (first surface-protecting layer in the case of two layers)
b. Thickness of second surface-protecting layer

The invention claimed is:

1. A decorative sheet comprising a laminate, the laminate comprising at least a base material sheet and a first surface-protecting layer in sequence in the thickness direction;

(1) the first surface-protecting layer comprising an ionizing radiation-curable resin containing an aliphatic urethane acrylate with an isocyanurate skeleton, and is an aliphatic urethane acrylate with an alicyclic skeleton without an isocyanurate skeleton; and (2) the first surface-protecting layer having a nanoindentation hardness of 160 MPa or more and 240 MPa or less, wherein a second surface-protecting layer is present, adjacent to the first surface-protecting layer, between the base material sheet and the first surface-protecting layer, the second surface-protecting layer has a nanoindentation hardness of 100 MPa or more and 240 MPa or less, and the nanoindentation hardness of the second surface-protecting layer is less than that of the first surface-protecting layer.

2. The decorative sheet according to claim 1, wherein the alicyclic skeleton is at least one of isophorone and cyclohexane.

3. The decorative sheet according to claim 1, wherein the ionizing radiation-curable resin is an electron beam-curable resin.

4. The decorative sheet according to claim 1, wherein the first surface-protecting layer comprises an inorganic filler.

5. The decorative sheet according to claim 4, wherein the inorganic filler is a hydrophobized inorganic filler.

6. The decorative sheet according to claim 1, wherein the first surface-protecting layer has a thickness of 5 μm or more and 30 μm or less.

7. The decorative sheet according to claim 1, wherein the second surface-protecting layer has a thickness of 5 μm or more and 15 μm or less.

8. The decorative sheet according to claim 1, which is used as a member of a decorative plate for floors.

9. A decorative plate comprising a laminate, the laminate comprising at least a decorative plate base and the decorative sheet according to claim 1 in sequence in the thickness direction.

10. The decorative plate according to claim 9, wherein the decorative plate base is at least one member selected from the group consisting of medium-density wood fiberboards, high-density wood fiberboards, particleboards, coniferous tree plywood, broadleaf tree plywood, fast-growing plywood, cork sheets, cork-containing composite base materials, and thermoplastic resin sheets.

11. The decorative sheet according to claim 2, wherein the ionizing radiation-curable resin is an electron beam-curable resin.

12. The decorative sheet according to claim 2, wherein the first surface-protecting layer comprises an inorganic filler.

13. The decorative sheet according to claim 12, wherein the inorganic filler is a hydrophobized inorganic filler.

14. The decorative sheet according to claim 2, wherein the first surface-protecting layer has a thickness of 5 μm or more and 30 μm or less.

15. The decorative sheet according to claim 2, which is used as a member of a decorative plate for floors.

16. A decorative plate comprising a laminate, the laminate comprising at least a decorative plate base and the decorative sheet according to claim 2 in sequence in the thickness direction.

* * * * *